United States Patent
Michaud

(10) Patent No.: US 12,443,567 B2
(45) Date of Patent: Oct. 14, 2025

(54) INDEX NODE DISTRIBUTION AND DISAGGREGATION

(71) Applicant: Dell Products L.P., Round Rock, TX (US)

(72) Inventor: Adrian Michaud, Carlisle, MA (US)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 18/494,392

(22) Filed: Oct. 25, 2023

(65) Prior Publication Data

US 2025/0139062 A1  May 1, 2025

(51) Int. Cl.
  *G06F 16/182* (2019.01)
  *G06F 16/13* (2019.01)

(52) U.S. Cl.
  CPC ............ *G06F 16/182* (2019.01); *G06F 16/13* (2019.01)

(58) Field of Classification Search
  None
  See application file for complete search history.

(56) References Cited

U.S. PATENT DOCUMENTS

| | | | |
|---|---|---|---|
| 6,438,595 B1 * | 8/2002 | Blumenau | H04L 67/1036 709/229 |
| 9,294,558 B1 * | 3/2016 | Vincent | H04L 67/1006 |
| 9,602,424 B1 * | 3/2017 | Vincent | H04L 67/1097 |
| 9,852,139 B1 * | 12/2017 | Chepa | H04L 67/1095 |
| 11,797,493 B1 * | 10/2023 | Crimi | G06F 16/137 |
| 2015/0278243 A1 * | 10/2015 | Vincent | G06F 16/182 707/634 |
| 2015/0280959 A1 * | 10/2015 | Vincent | H04L 67/52 709/203 |
| 2016/0210308 A1 * | 7/2016 | Shekhar | G06F 3/0619 |
| 2021/0303522 A1 * | 9/2021 | Periyagaram | G06F 16/178 |
| 2021/0342301 A1 * | 11/2021 | Kamalaksha | G06F 16/178 |

FOREIGN PATENT DOCUMENTS

| | | | | |
|---|---|---|---|---|
| WO | WO-2004055675 A1 * | 7/2004 | | G06F 16/176 |
| WO | WO-2021202175 A1 * | 10/2021 | | G06F 16/13 |

OTHER PUBLICATIONS

Macko P, Hennessey J. Survey of distributed file system design choices. ACM Transactions on Storage (TOS). Mar. 3, 2022;18(1):1-34. (Year: 2022).*

* cited by examiner

*Primary Examiner* — Uyen T Le
(74) *Attorney, Agent, or Firm* — Chamberlain, Hrdlicka, White, Williams & Aughtry; Aly Z. Dossa

(57) ABSTRACT

A system for managing the storage of metadata includes a client device, a network, and two or more file system servers, including a first file system server and a second file system server. The first file system server is programmed to: receive a request for a file system object from the client device, in response to the request: make a determination that the second file system server is to manage the file system object, based on the determination, generate an index node (I-node), and send the I-node to the second file system server. The I-node includes an object type field corresponding to a type of the file system object, a server base index field corresponding to the second file system server, and a directory index field corresponding to an index in a file system object metadata of the second file system server.

18 Claims, 12 Drawing Sheets

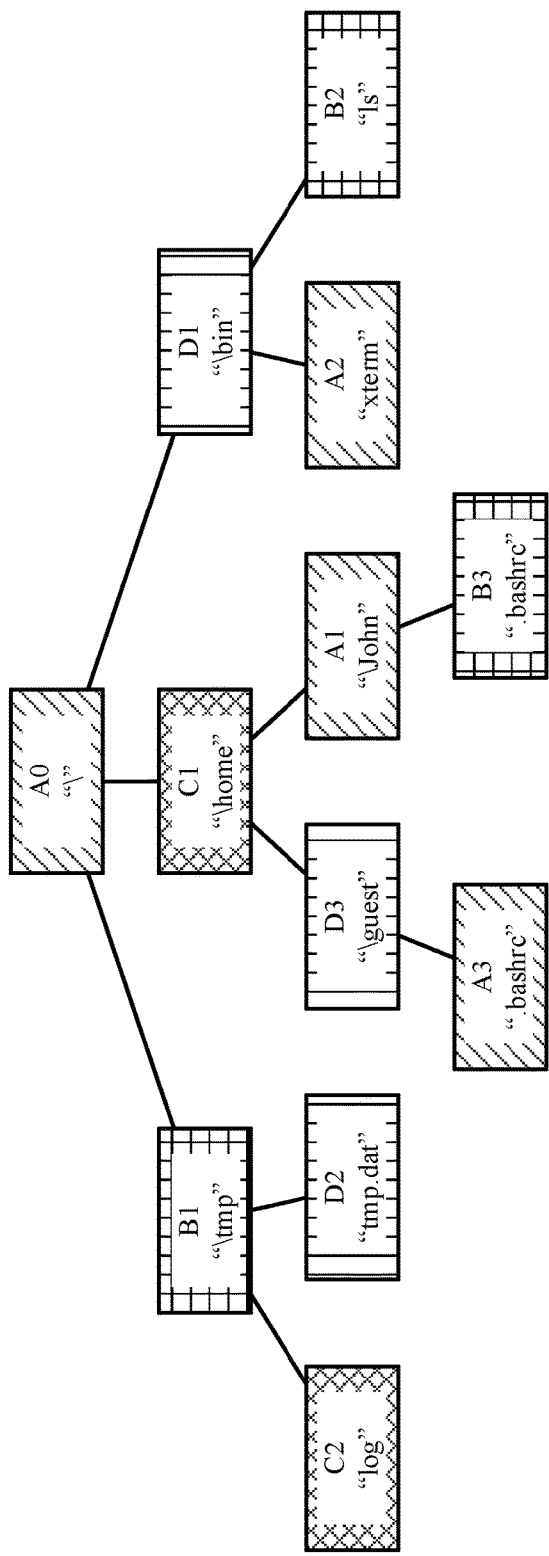
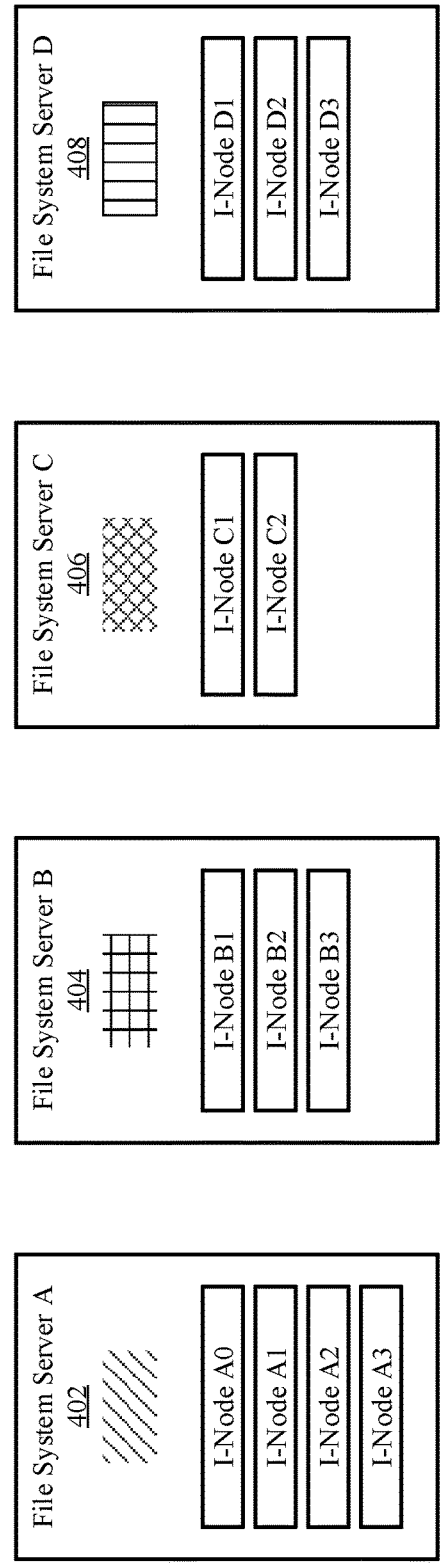
FIG. 4A
FIG. 4B

INDEX NODE DISTRIBUTION AND DISAGGREGATION

BACKGROUND

Computing devices may include any number of internal components such as processors, memory, and persistent storage. Each of the internal components of a computing device may be used to generate data. The process of generating, storing, and transferring data across a system of devices may utilize resources of the computing devices such as processing and storage. The utilization of the aforementioned resources to generate, store, and transfer data may impact the overall performance of the resources. File systems may use network capabilities and processing capabilities to read requests for files and/or other directories.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 4A-4F show an example in accordance with one or more embodiments of the invention.

DETAILED DESCRIPTION

Figure 1A:
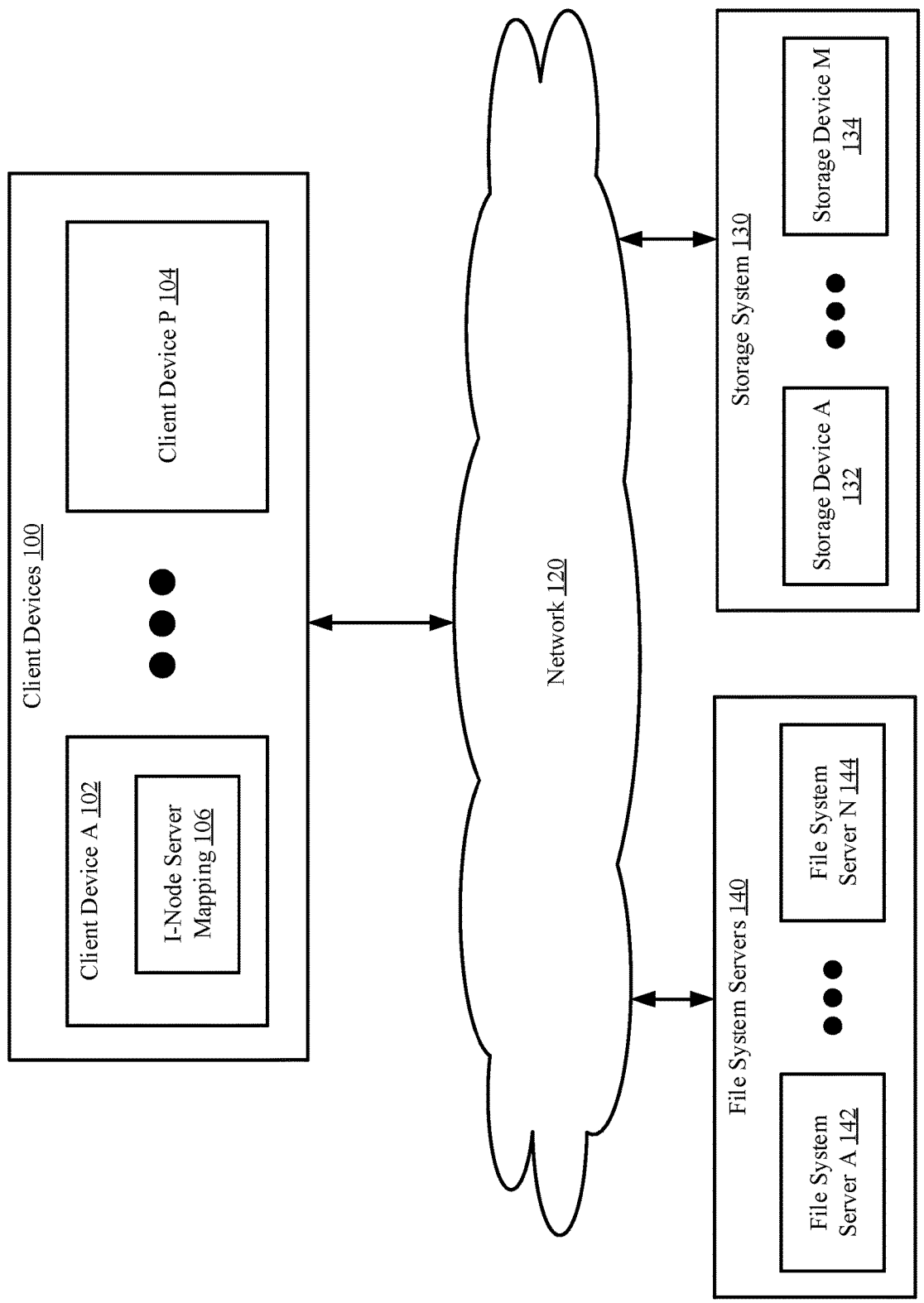
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this disclosure, elements of figures may be labeled as A to N, A to P, A to M, or A to L. As used herein, the aforementioned labeling means that the element may include any number of items, and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, operably connected, or operative connection, means that there exists between elements, components, and/or devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

In general, embodiments of the invention may relate to a method and system for managing metadata. Embodiments of the invention may include a new index node (I-node) encoding scheme, methods for distribution, disaggregation, and encoding method for file systems. In one or more embodiments disclosed herein, an I-node is a data structure used in the file systems for storing, retrieving data and/or metadata information associated with a file system object (e.g., directories, files, etc.). The I-node may include information such as, for example, ownership, permissions, timestamps, file size, and location of the data blocks on a storage system for the corresponding file system object. Each file system object may be associated with a unique I-node number. When a file system object such as, for example, a file or directory is opened, the corresponding I-node is used to locate the corresponding information for the file or directory.

Embodiments disclosed herein provide methods and systems for providing the ability to identify, route, locate, and process I-nodes while reducing the use of additional metadata. Such methods and systems may be implemented using distributed file systems. The distributed file systems may utilize two or more file system servers that each manage a portion of all file system objects in the file system. Embodiments disclosed herein provide methods for distributing, by any one of the file system servers, the assignment of new I-nodes across the file system servers based on indexing of the current I-nodes (which is specified in the I-node itself) in the file system server. In one or more embodiments, the assignment may be based on a load balancing operation performed by the file system server performing the assignment. The file system server, after assigning and generating the I-node, sends the I-node to the assigned file system server for processing and storage. The assigned file system server, in response to receiving the new I-node, may generate and store the corresponding data.

For I-nodes that correspond to a directory, the assigned file system server may store metadata that specifies the list of file system objects in the corresponding directory. For I-nodes that correspond to a file, the assigned file system server may store the file data in the storage system and store the metadata that includes the address for the file data in the storage system.

Various embodiments of the invention are described below.

FIG. 1A shows an example system in accordance with one or more embodiments of the invention. The system includes one or more client devices (100), a storage system (130) that includes one or more storage devices (132, 134), a set of two or more file system servers (140), and a network (120) operatively connected to each of the client devices (100), the file system servers (142, 144), and the storage system (130). The components in the system may be operably connected via any combination of wired and/or wireless connections. The system may include additional, fewer, and/or different components without departing from the invention. Each component in the system is operably connected via any combination of wired and/or wireless connections.

In one or more embodiments disclosed herein, the client devices (100) provide services to users operating the client devices (100). The services may be provided using applications executing on the client devices (100). The applications may be logical entities executed using computing resources (not shown) of the client devices (102, 104). Each of the applications may be performing similar or different processes. In one or more embodiments disclosed herein, the applications provide services to the client devices. For example, the applications may host components. The components may be, for example, instances of databases, email servers, operating systems, and/or other components. The applications may host other types of components without departing from the invention. An application may execute on one or more client devices (e.g., 102, 104) as instances of the application. The applications may utilize data stored in memory. The applications may utilize data stored in the storage system (130) and/or in the file system servers (140). The client devices (100) may access such data using a connection to the file system servers (140) via the network (120).

Figure 5:
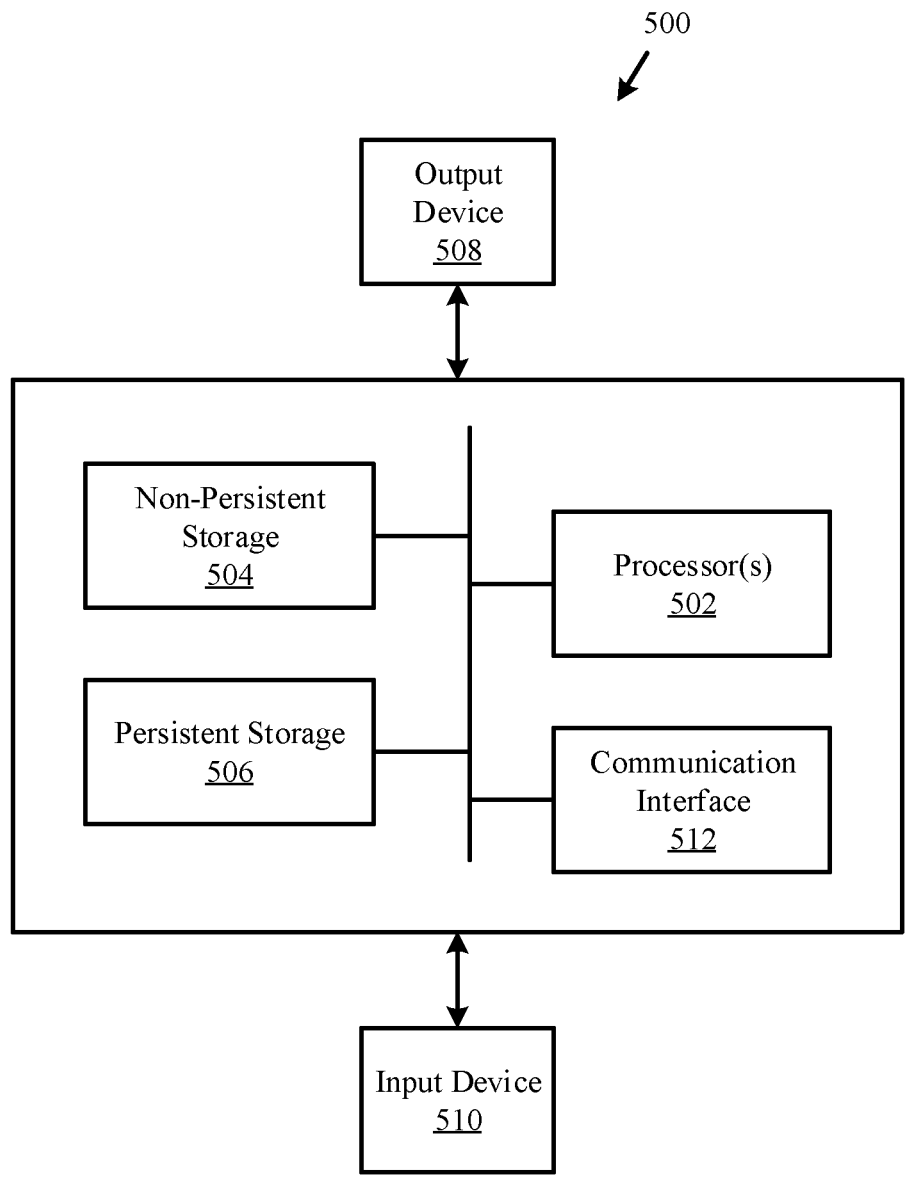
FIG. 5 shows a diagram of a computing device in accordance with one or more embodiments of the invention.

In one or more embodiments, each of the client devices (102, 104) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device (102, 104) described throughout this application.

In one or more embodiments disclosed herein, one or more of the client devices (102, 104) is implemented as a logical device. The logical device may utilize the computing resources of any number of computing devices and thereby provide the functionality of the client device (102, 104) described throughout this application.

In one or more embodiments disclosed herein, the network (120) includes one or more network devices operatively connected to at least one of the client devices (102, 104) and one or more of the storage devices (132, 134) of the storage system (130). In one or more embodiments, the network (120) includes functionality for providing access to data in the storage system (130) as requested by the client devices (100) and/or the file system servers (140). The network devices may access the data from the memory devices of the storage devices (132, 134). For example, the network devices may access the memory devices using remote direct memory access (RDMA). In one or more embodiments disclosed herein, RDMA is a mechanism for directly accessing memory stored in a remote location (e.g., in the storage system (130)). In such embodiments, the network devices may be RDMA fabric devices. One or more RDMA fabric devices may access the storage devices (132, 134) without departing from the invention.

In one or more embodiments disclosed herein, the file system servers (140) manage a file system. A file system may refer to an organization of files, directories, and/or other file system objects based on a hierarchical structure. The hierarchical structure may include a root directory that is a parent directory for one or more file system objects such as other directories, other files, and/or other types of file system objects. Each of the other directories may be parent directories for additional file system objects, etc. such that each file system object is associated with a parent directory.

In one or more embodiments disclosed herein, each file system server (142, 144) manages one or more file system objects (not shown). The file system objects managed by each file system server (142, 144) may be a portion of all the file system objects in the file system. In this manner, collectively, all file system servers (140) manage all file system objects in the file system. Further, multiple file system servers (142, 144) may manage one or more file system objects. Said another way, a file system object may be managed by one or multiple file system servers (142, 144).

Each file system object may be indexed in a file system server (142, 144) using an index node (I-node). As discussed above, an I-node may refer to a data structure used in the file systems for storing, retrieving data and/or metadata information associated with a file system object (e.g., directories, files, etc.). Each file system object may be identified with a unique I-node number. The generation, distribution, and disaggregation of I-nodes may be performed in accordance with, for example, the methods of FIGS. 3A-3B.

In one or more embodiments disclosed herein, each of the file system servers (142, 144) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the file system servers (142, 144) described throughout this application.

In one or more embodiments disclosed herein, one or more of the file system servers (142, 144) is implemented as a logical device. The logical device may utilize the computing resources of any number of computing devices and thereby provide the functionality of the file system servers (142, 144) described throughout this application. For additional details regarding a file system server (142, 144), see, e.g., FIG. 1B.

In one or more embodiments disclosed herein, the storage system (130) is a system used for storing data associated with a file system managed by the file system servers (140). The storage system (130) may include any number of storage devices (132, 134). Each storage device (132) may store a portion of persistent or non-persistent storage that, collectively for all portions of memory, include the memory used by the file system servers (140) to store data for the applications of the client devices (100).

In one or more embodiments disclosed herein, each of the storage devices (132, 134) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the storage devices (132, 134) described throughout this application.

In one or more embodiments disclosed herein, one or more of the storage devices (132, 134) is implemented as a logical device. The logical device may utilize the computing resources of any number of computing devices and thereby provide the functionality of the storage devices (132, 134) described throughout this application. For additional details regarding a storage device (132, 134), see, e.g., FIG. 1C.

While the system of FIG. 1A has been illustrated and described as including a limited number of specific components, a system in accordance with embodiments of the invention may include additional, fewer, and/or different components without departing from the invention.

Figure 1B:
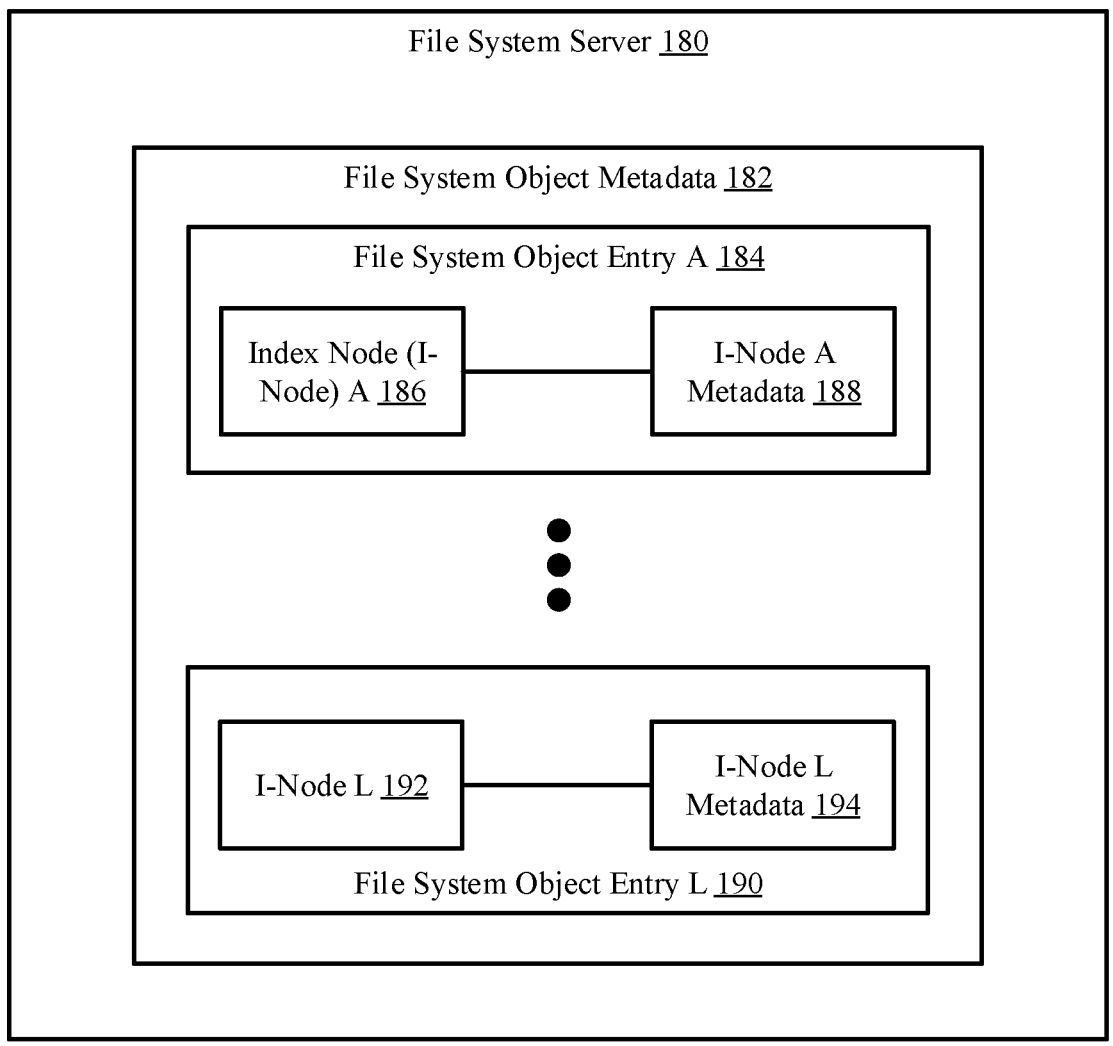
FIG. 1B shows a diagram of a file system server in accordance with one or more embodiments of the invention.

FIG. 1B shows a diagram of a file system server in accordance with one or more embodiments of the invention. The file system server (180) may be an embodiment of one of the file system servers (142, 144, FIG. 1A) discussed above. As discussed above, the file system server (180) manages a portion of the file system objects in a file system. To perform the aforementioned functionality, the file system server (180) may include a file system object metadata (182). The file system server (180) may include additional, fewer, and/or different components without departing from the invention. Each of the components illustrated in FIG. 1B is discussed below.

In one or more embodiments, the file system object metadata (182) includes file system object entries (184, 190) (also referred to as "entries") that are each associated with a file system object of a file system. Each entry (184, 190) includes an I-node (186, 192) and corresponding I-node metadata (188, 194). As discussed above, the I-node (186, 192) is a data structure that uniquely identifies a file system object of a file system. For additional details regarding an I-node, see, e.g., FIG. 2.

For example, I-node A (186) uniquely identifies a first file system object managed by the file system server (180). Entry A (184), which includes I-node A (184), is the first index in the file system object metadata (182). Continuing the example, I-node L (192) uniquely identifies a second file system object. Entry L (190), which includes I-node L (192), is indexed last in the file system object metadata (182).

In one or more embodiments disclosed herein, the I-node A metadata (188) specifies the metadata for the first file system object (i.e., the file system object of I-node A (186)). The metadata specified in I-node A metadata (188) is based on a type of the file system object.

For example, if the first file system object is a directory, the I-node A metadata (188) specifies a list of file system objects of which the first file system object is the parent. The file system objects may specify a name of each of the list of file system objects and the corresponding I-node.

As a second example, if the first file system object is a file (or another file system object other than a directory), the I-node A metadata (188) specifies the information required to access the file data from the storage system (e.g., 130, FIG. 1A). Such information may include a network address for a storage location of the file data in a storage device (132, 134, FIG. 1A).

While the disclosure describes information included for two types of file system objects, the I-node metadata (188, 194) may include information for other types of file system objects without departing from the invention.

Figure 1C:
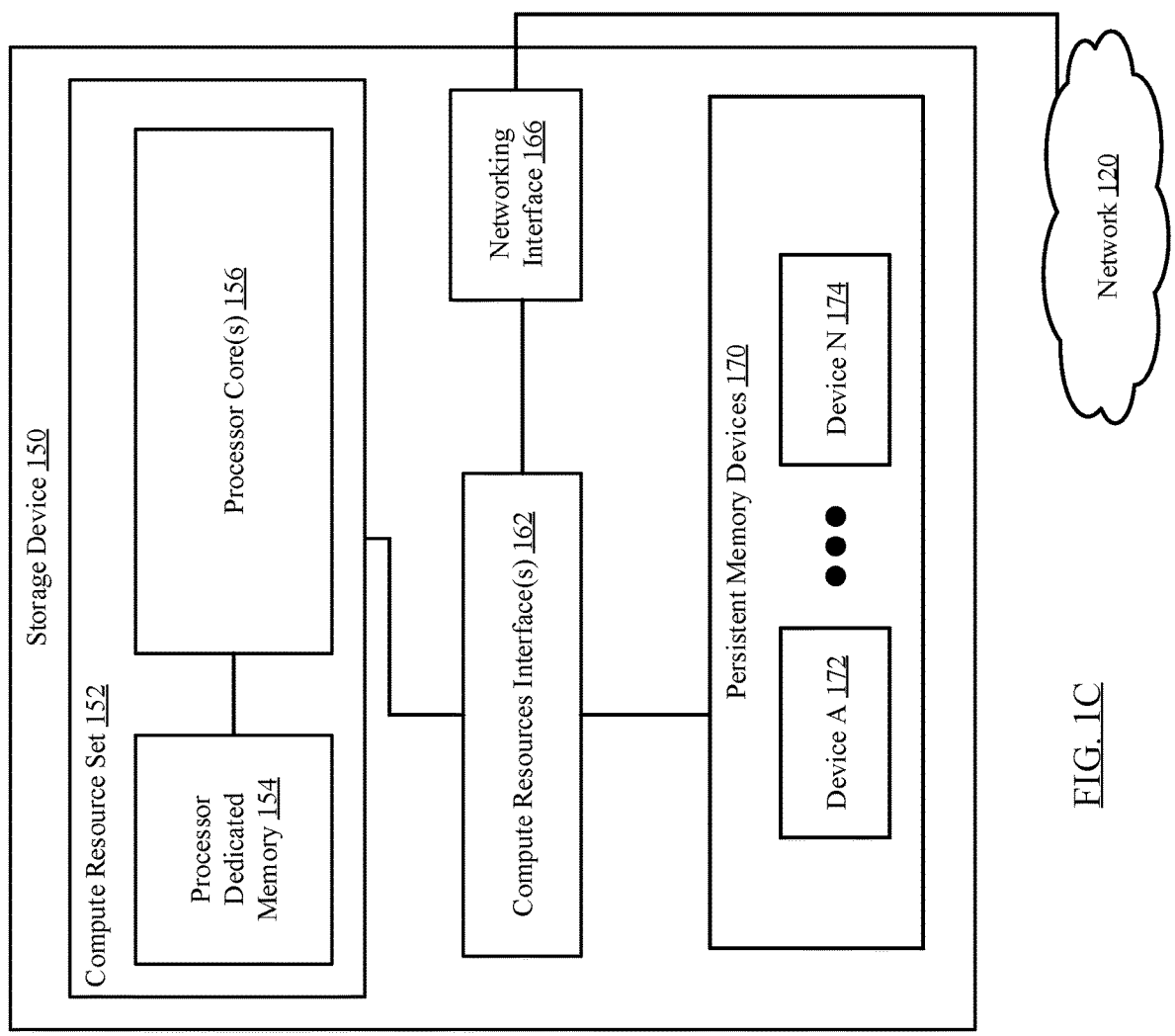
FIG. 1C shows a diagram of a storage device in accordance with one or more embodiments of the invention.

FIG. 1C shows a diagram of a storage device in accordance with one or more embodiments of the invention. The storage device (150) of FIG. 1C may be an embodiment of a storage device (132, 134, FIG. 1A) discussed above. The storage device (150) may include a compute resource set (152) that includes processor dedicated memory (154), one or more processor cores (156), one or more compute resources interfaces (162), a networking interface (166), and one or more persistent memory devices (170). The storage device (150) may include additional, fewer, and/or different components without departing from the invention. Each of the components illustrated in FIG. 1C is discussed below.

In one or more embodiments, the compute resource set (152) may include one or more processor cores (156) operably connected to the processor dedicated memory (154) (e.g., cache). Consequently, the compute resource set (152) may host any number of executing processes thereby enabling any number and type of workloads to be performed. When performing the workloads, the compute resource set (152) may utilize computing resources provided by the hardware of the storage device (150).

The processor cores (156) of the compute resource set (152) may be operably connected to the persistent memory devices (170). For example, the processor cores (156) may be connected to a compute resource interface (162), which is also connected to the persistent memory devices (170).

In one or more embodiments, the processor cores (156) may be operably connected to external resources (e.g., RDMA fabric devices) via the networking interface (166) and the network (120).

In one or more embodiments, the compute resource set (152) may be implemented using one or more sockets. In one or more embodiments, a socket is a device that provides direct connection between electrical components (e.g., microprocessors, motherboard, etc.) in a processor. The socket may be arranged, for example, in a pin grid array (PGA) architecture. Each socket may include a set of processor cores, a set of processor dedicated memory, and a connection to one of the compute resources interfaces (162). In such embodiments where the compute resource set (152) includes two or more sockets, the multiple sockets may provide a connection to the other sockets in the storage device (150) via, for example, a socket interconnect. The socket interconnects may be implemented as, for example, an ultra-path interconnect (UPI). Other socket interconnects may be used without departing from the invention.

Examples of compute resource sets include, but are not limited to, single-core CPUs, multi-core CPUs, graphics processing units (GPUs), and field programmable gate arrays (FPGAs).

In one or more embodiments disclosed herein, the networking interface (166) includes functionality for distributing the storage of data between the persistent memory devices (170) and external components (e.g., RDMA fabric devices in the network (120)) The networking interface (166) may access the persistent memory devices (170) via one or more compute resources interfaces (162).

The compute resources interface (162) may be implemented using any suitable interconnection technology including, for example, system buses such as compute express links or other interconnection protocols. For example, the compute resources interface (162) may be implemented as a peripheral component interconnect express (PCIe) device. The compute resources interface (162) may support any input/output (IO) protocol, any memory protocol, any coherence interface, etc. The compute resources interface (162) may support processor to device connections, processor to memory connections, and/or other types of connections. The compute resources interface (162) may be implemented using one or more hardware devices including circuitry adapted to provide the functionality of the compute resources interface (162).

The networking interface (166) may be implemented using any suitable interconnection technology including, for example, system buses such as compute express links or other interconnection protocols. The networking interface (166) may support any input/output (IO) protocol, any memory protocol, any coherence interface, etc. The networking interface (166) may support processor to device connections, processor to memory connections, and/or other types of connections. The networking interface (166) may be implemented using one or more hardware devices including circuitry adapted to provide the functionality of the networking interface (166) described herein.

In one or more embodiments, the persistent memory devices (170) are devices that provide storage via persistent memory. The persistent memory devices (172, 174) may be implemented as, for example, solid-state memory devices, non-volatile dual in-line memory modules (NVDIMMs), or non-volatile random access memory (NVRAM). The persistent memory devices (170) may be other types of memory devices without departing from the invention. The persistent memory devices (170) may be connected to the storage device (150) via the compute resource interfaces (162).

While the present disclosure discusses a storage device (150) as using persistent memory, any type of persistent or non-persistent storage may be used without departing from the invention.

Figure 2:
FIG. 2 shows a diagram of an index node (I-node) in accordance with one or more embodiments of the invention.

FIG. 2 shows a diagram of an I-node in accordance with one or more embodiments of the invention. The I-node (202) may be an embodiment of I-nodes as discussed throughout this disclosure. As discussed above, the I-node (202) uniquely identifies a file system object of a file system. The I-node (202) of FIG. 2 includes an object type field (204), a server base index field (206), and a directory index field (208). The I-node (202) may include additional, fewer, and/or different portions of data without departing from the invention.

In one or more embodiments disclosed herein, the object type field (204) is a portion of data that corresponds to a type of file system object of the I-node (202). Examples of types of file system objects include, but are not limited to: a directory, an unassigned type (e.g., not allocated to a type), a regular file, a link, a character file, a block file, a socket file, a deleted file, and a first-in first-out (FIFO) special file. Other information may be indicated in the object type field (204) without departing from the invention.

In one or more embodiments disclosed herein, the server base index field (206) is a portion of data that corresponds to the assigned file system server to manage the file system object. The server base index field (206) may specify a server base index corresponding to the file system server. Other information may be indicated in the server base index field (206) without departing from the invention.

In one or more embodiments, the directory index field (208) is a portion of data that corresponds to an assigned entry index in a local file system object metadata of the file system server managing the file system object. For example, if the file system object is the first indexed entry in a file system object metadata (182, FIG. 1B), the directory index field (208) may correspond that entry index. Alternatively or additionally, in one or more embodiments, the directory index field (208) may include a value corresponding to the directory index of the file system object in the corresponding directory that parents the file system object. Other information may be indicated in the directory index field (208) without departing from the invention.

For example, for a file system object that is indexed fourth in a directory of a file system, and the corresponding I-node (202) indexed second in the file system object metadata of the file system server, the directory index field (208) may include any combination of: (i) a value indicating the second index in the file system object metadata, and (ii) a value indicating the fourth index in the directory.

In one or more embodiments, each of the object type field (204), server base index field (206), and the directory index field (208) may be assigned a predetermined number of bits of data to encode the given corresponding information. The number of bits assigned to each field (204, 206, 208) may be based on the expected maximum total number of a given variable.

In an example I-node, four bits are reserved for the object type field (204), twelve bits are reserved for the server base index field (206), and forty-eight bits are reserved for the directory index field (208). In this example, the I-nodes of a file system may encode up to $2^4$ (i.e., 16) different types of file system objects, up to $2^{12}$ (i.e., 4096) file system servers, and up to $2^{48}$ (i.e., 2.81×10^14) number of file system objects indexed in a file system. In this setup, the directory index field (208) may include additional information such as, for example, ownership of the file system object, permissions, timestamps, file size, and location of the data blocks on a storage system for the corresponding file system object. Other information may be indicated in the directory index field (208) without departing from the invention.

Figure 3A:
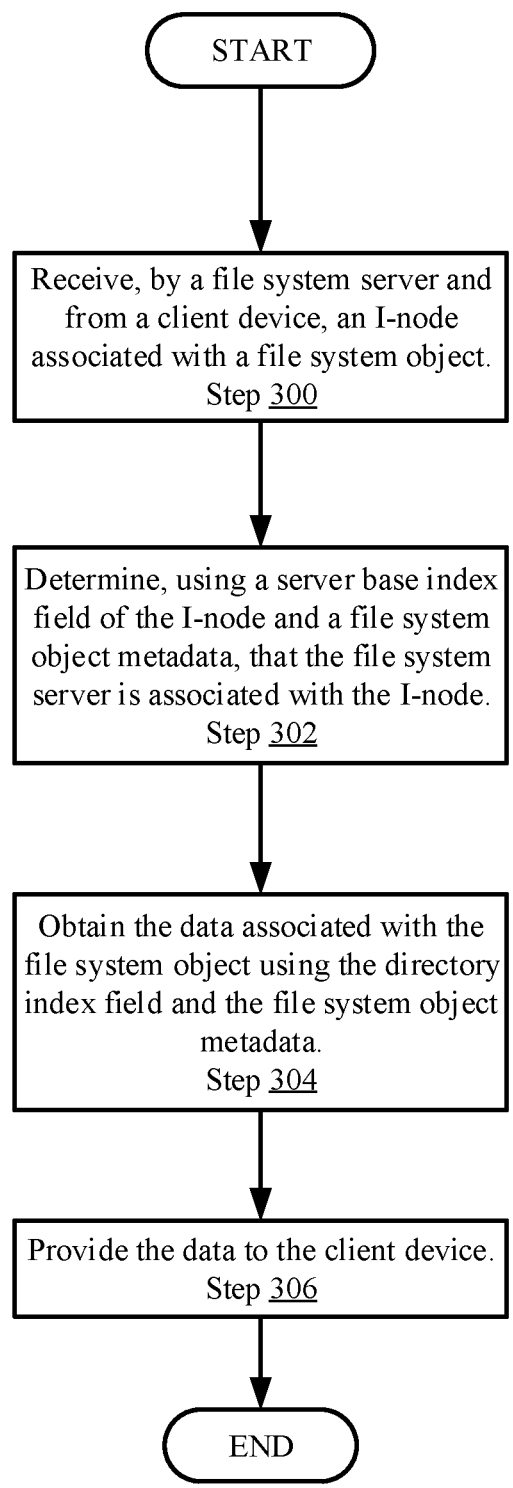
FIG. 3A shows a flowchart for managing requests for I-nodes in accordance with one or more embodiments of the invention.

FIG. 3A shows a flowchart for managing requests for I-nodes in accordance with one or more embodiments of the invention. The method shown in FIG. 3A may be performed by, for example, a file system server (142, 144, FIG. 1A). Other components of the system illustrated in FIGS. 1A-1C may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to the method, in step 300 (FIG. 3A), an I-node associated with a file system object is obtained. In one or more embodiments disclosed herein, the I-node is obtained from a request by a client device to access the file system object. As discussed above, the file system object may be a directory, a regular file, and/or any other type disclosed or not disclosed herein.

In step 302, the file system server determines, using a server base index field of the I-node, that the file system server is associated with the I-node. In one or more embodiments, the file system server reads the corresponding field of the I-node to confirm that the file system server manages the file system object corresponding to the I-node.

In step 304, the file system server uses the directory index field and the file system object metadata to locate the data associated with the file system object. In one or more embodiments, the file system object metadata are indexed based on the directory index field specified in each I-node. The file system server uses the directory index field of the received I-node to identify the associated entry in the file system object metadata.

In one or more embodiments, the metadata specified in the identified entry is based on the type of the file system object. For example, if the file system object is a directory, the data to be obtained is a list of the file system objects that the received file system object is parent. The list is obtained from storage in the file system server.

Alternatively, if the file system object is a file (e.g., regular file, FIFO special file, block file, etc.), the identified entry includes metadata for obtaining the file data from the storage system. The data may be obtained from the storage system using the metadata.

In step 306, the data is provided to the client device. The provided data may be, for example, a list of file system objects if the received I-node corresponds to a directory, or file data if the I-node corresponds to a file.

Figure 3B:
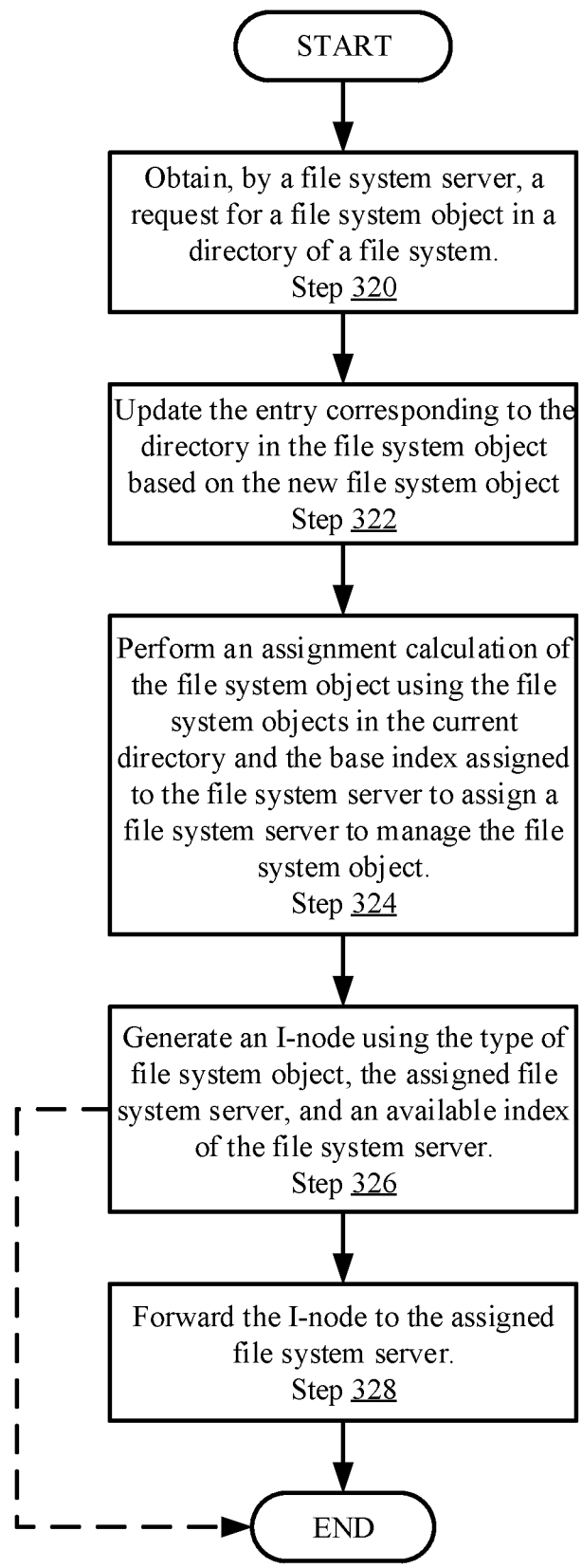
FIG. 3B shows a flowchart for managing distribution of an I-node in accordance with one or more embodiments of the invention.

FIG. 3B shows a flowchart for managing distribution of an I-node in accordance with one or more embodiments of the invention. The method shown in FIG. 3B may be performed by, for example, a file system server (142, 144, FIG. 1A). Other components of the system illustrated in FIGS. 1A-1C may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 3B, in step 320, a request for a new file system object in a directory of a file system is obtained. The request may be sent by a client device using a user interface for the file system. The directory may be one managed by the file system server obtaining the request.

In step 322, an entry corresponding to the directory is updated based on the new file system object. In one or more embodiments, the I-node corresponding to the directory is located in the file system object metadata. The corresponding metadata is updated to include the new file system object. The metadata, stored in the entry of the located I-node, may include a list of file system objects of the directory. In this manner, the list of the file system objects now includes the new file system object.

In step 324, an assignment calculation of the file system object is performed using the file system objects in the current directory and a base index assigned to the file system server to determine the assigned file system server. In one or more embodiments, the assignment calculation is performed based on a load balancing operation performed on the file system servers. For example, the file system server may determine a file system server that incurs the least load from the set of file system servers in the system. The determined file system server may be assigned to manage the new file system object.

In one or more embodiments, the assignment is performed based on a round-robin algorithm. The round robin algorithm may be a function that inputs a server base index of the file system server, a directory index of the new file system object in the directory, and the total number of file system servers in the system. An Example Equation 1 that represents the round-robin algorithm is provided below:

assigned_server=(base_server_index+
directory_index) %
number_servers  Example Equation 1: Round-Robin Algorithm To provide context to the above equation, each file system server is assigned a number between 0 and one minus the total number of file system servers. For example, for a system of four file system servers, the file system servers may be assigned a number of either 0, 1, 2, or 3.

Turning to the above example equation, the assigned_server variable refers to the calculated number that corresponds to the file system server to be assigned to manage the new file system object. The base_server_index variable corresponds to the corresponding base server index for the file system server performing the method of FIG. 3B. The directory_index corresponds to a numerical value of the directory index of the new file system object in the directory. For example, for a directory that includes five file system objects (including the new file system object), the directory_index of the new file system object may be "5". The number_servers variable corresponds to the total number of file system servers in the system. The sum of the base_server_index and the directory_index is taken, and a modulo operation is applied to this sum and the number_servers variable to return the assigned_server value.

As an example, consider a scenario in which a system of five file system servers manage an entire file system. Each server is assigned a server base index, which is a number between 0 and 4. The file system includes a directory named "\Steve". The "\Steve" directory is managed by a first file system server, with server base index "0". The "\Steve" directory includes eight file system objects, each assigned a directory index between 0 and 7. The first file system server obtains a request for a new file named "test.txt", parented by the directory. To determine which file system server in the system is assigned the new file, the first file system server uses Example Equation 1 by inputting: 0 for the base_index, 8 for the directory_index (because that is the next available directory index for the new file in the "Steve" directory), and 5 for the number_server. The result is an assigned_server value of 3. Based on the result of applying the round-robin algorithm, the file system server corresponding to the base index of 3 is assigned the new file.

Continuing with the discussion of FIG. 3B, in step 324, an I-node is generated using the type of the new file system object, the assigned file index system server, and a directory index of the file system server. The I-node may be generated to include an object type field that is an assigned value corresponding to the type of the new file system object. The generated I-node may further include the object type field that includes a value corresponding to the type of the file system object determined above. Further, the generated I-node may further include the directory index field that includes a value corresponding to the directory index.

In step 326, the I-node is forwarded to the assigned file system server.

Figure 3C:
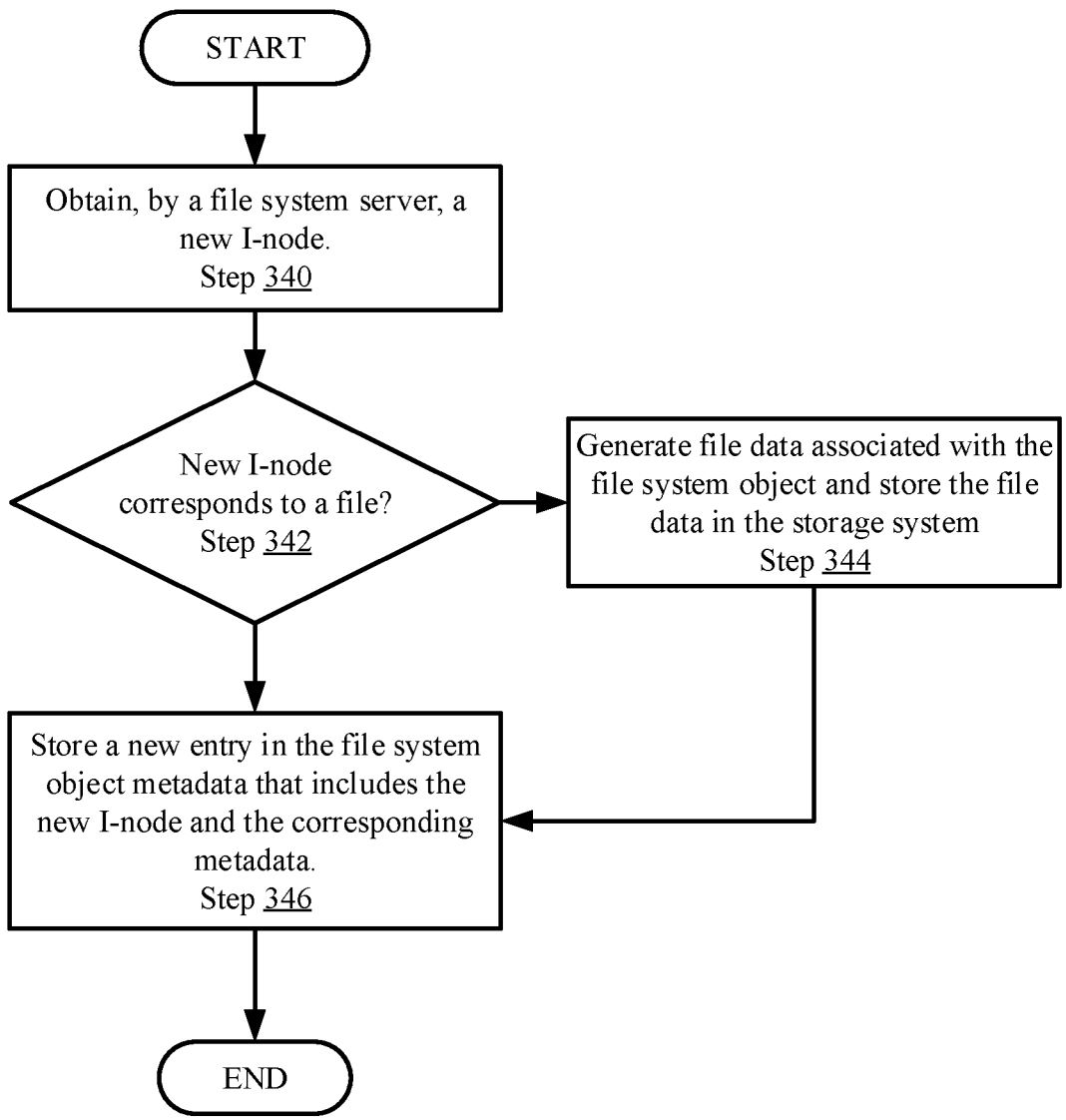
FIG. 3C shows a flowchart for storing a new I-node in accordance with one or more embodiments of the invention.

FIG. 3C shows a flowchart for storing a new I-node in accordance with one or more embodiments of the invention.

The method shown in FIG. 3C may be performed by, for example, a file system server (142, 144, FIG. 1A). Other components of the system illustrated in FIGS. 1A-1C may perform the method of FIG. 3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 3C, in step 340, a new I-node is obtained. The new I-node may be the I-node forwarded in FIG. 3B.

In step 342, a determination is made about whether the new I-node corresponds to a file. The determination is made based on the object type field included in the I-node. If the new I-node corresponds to a file, the method proceeds to step 344. Otherwise (e.g., if the new I-node corresponds to a directory), the method proceeds to step 346.

In step 344, file data associated with the file system object is generated and stored in the storage system. In one or more embodiments, the file data is generated based on the contents of the file. The file data may be based on data generated by an application of the client device that initiated the generation of the file. The file data may be stored in one of the storage devices in the storage system. The file data may be stored in the storage system via the network discussed throughout.

In step 346, a new entry in the file system object metadata is stored. The new entry may include the I-node and metadata corresponding to the file system object. In one embodiment, if the file system object is a file, the stored metadata may include a storage location of the file data of step 344. In another embodiment, if the file system object is a directory, the stored metadata is a list of the file system objects in the directory and/or any additional information of each of the listed file system objects. The additional information may include, for example, the I-nodes of the listed file system objects, the corresponding file system servers, the corresponding index in the directory, and/or a timestamp corresponding to each listed file system object.

Example

The following section describes an example. The example is not intended to limit the invention. The example is illustrated in FIGS. 4A-4F. Turning to the example, consider a scenario in which an example file system is managed via one or more embodiments of the invention described herein.

For the purposes of this example, the terms "I-node" and "file system object" may be used interchangeably, as each I-node corresponds to a file system object in the file system. The interchangeability of these terms may not apply to the rest of this disclosure outside of this Example section.

Turning to the example, FIG. 4A shows a diagram of a graphical representation of the example file system. The example file system is organized in a hierarchical manner that includes a root directory with I-node A0 (named "\") that is a parent to three directories (I-node B1 named "\tmp", I-node C1 named "\home", and I-node D1 named "\bin"). Each of the three directories is parent to additional file system objects, as illustrated by connections in FIG. 4A.

Each I-node is assigned to one of four file system servers. The four file system servers comprise the total file system servers managing the file system. The assignment of each file system object is illustrated based on a shading pattern of the file system object. Each shading pattern corresponds to a file system server. A diagonal line pattern (as illustrated in, e.g., I-node A0) corresponds to file system server A; a box pattern (as illustrated in, e.g., I-node B1) corresponds to file system server B; a diagonal cross pattern (as illustrated in, e.g., I-node C1) corresponds to file system server C; and a vertical line pattern (as illustrated in, e.g., D1) corresponds to file system server D.

Turning to FIG. 4B, FIG. 4B shows a diagram of the four file system servers. As illustrated in FIG. 4B, file system server A (402), illustrated in FIG. 4B as corresponding to the diagonal pattern, is assigned to manage I-nodes A0, A1, A2, and A3; file system server B (404), corresponding to the box pattern, is assigned to manage I-nodes B1, B2, and B3; file system server C (406), corresponding to the diagonal cross pattern, is assigned to manage I-nodes C1 and C2; and file system server D (408), corresponding to the vertical line pattern, is assigned to manage I-nodes D1, D2, and D3.

Figure 4C:
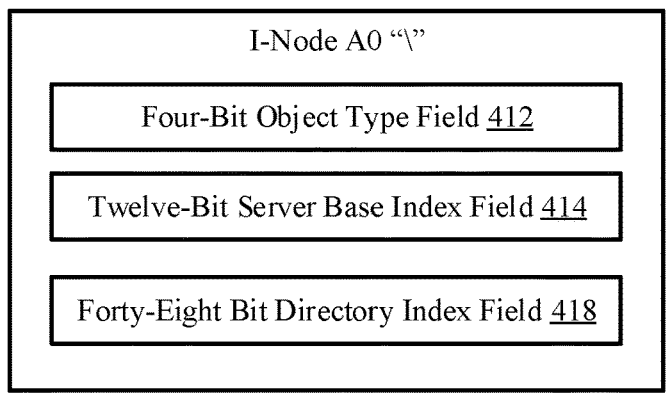

FIG. 4C shows a diagram of I-node A0. I-node A0 includes data such as an object type field (412), a twelve-bit server base index (414), and a forty-eight bit directory index field (418). Using the above data included in I-node A0, any file system server in the system may be aware of the server assigned to manage I-node A0, the type of file system object of I-node A0, and the directory index of I-node A0. In this example: I-node A0 is assigned to file system server A (402, FIG. 4B); the type of I-node A0 is a directory; and because I-node A0 is a root directory, the directory index is 0.

To clarify the labeling of the I-nodes throughout this example, the I-nodes may be labeled based on their assigned servers and their assigned entry index (also referred to as "local index") in the file system object metadata. In this example, the "A" in "I-node A0" corresponds to the assignment of the I-node to file system server A (402). Further, the "0" in "I-node A0" corresponds to the first index (e.g., index "0") in the file system object metadata of file system server A (402).

File system server A (402) stores additional metadata associated with I-node A0. Specifically, because I-node A0 is a directory, the metadata includes a list of the file system objects that are parented by I-node A0. Specifically, the list specifies the names of I-nodes B1 ("\tmp"), C1 ("\home"), and D1 ("/bin"). Further, because of the organization of the names of I-nodes B1, C1, and D1, file system server A (402) may also calculate the assigned file system server of these I-nodes and their corresponding local indices.

Figure 4D:
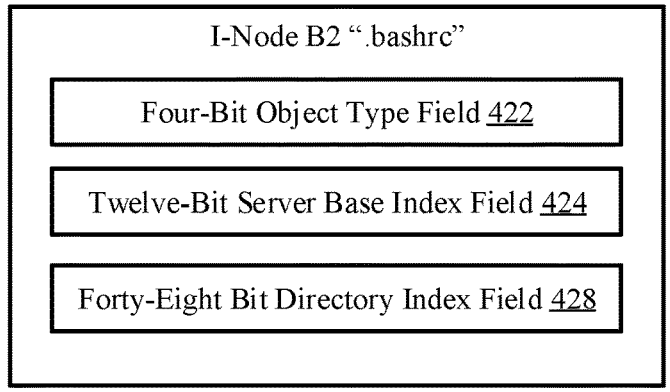

Similarly, in FIG. 4D, a diagram of I-node B2 is shown. I-node B2, also illustrated in FIG. 4A as being named ".bashrc", includes data such as its object type field (422), a twelve-bit server base index (424), and a forty-eight bit directory index field (428). Similar to I-node A0, any file system server in the system may be aware of the server assigned to manage I-node B2, the type of file system object of I-node B2, and the directory index of I-node B2. In this example: I-node B2 is assigned to file system server B (404, FIG. 4B); the type of I-node B2 is a file; and because I-node B2 is the second index in the file system object metadata of file system server B (404), the directory index is 2.

File system server B (404) stores additional metadata associated with I-node B2. In contrast to I-node A0, I-node B2 is a file and not a directory. As such, the metadata stored for I-node B2 includes the storage location of the file data in a storage system (not shown in this example). The storage location is accessible via a specified address for memory in a storage device of the storage system. The specified address is "1.123.2".

Figure 4E:
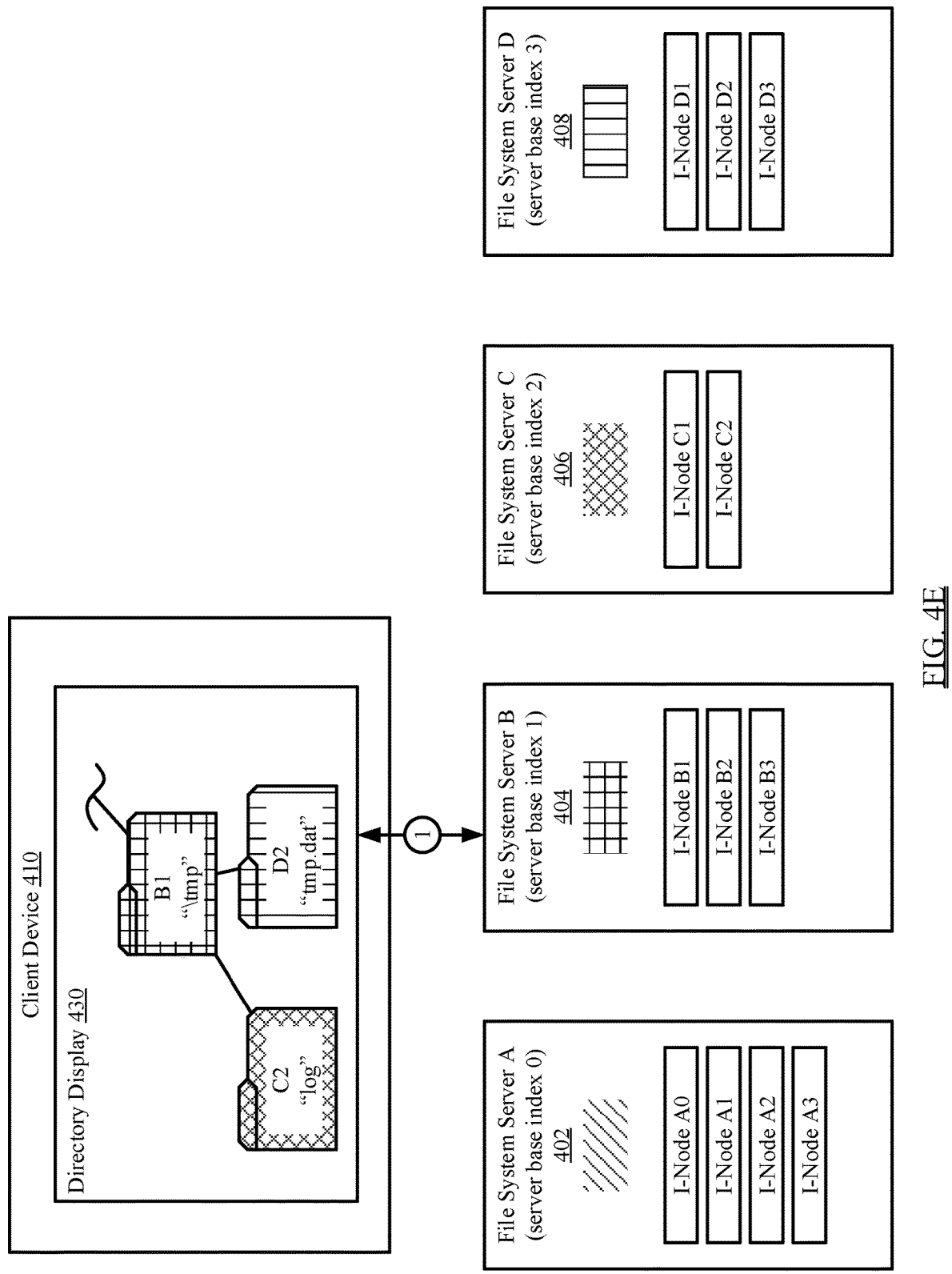

Turning to FIG. 4E, FIG. 4E shows a diagram of an example system. For the sake of brevity, not all components in the example system are illustrated in FIG. 4E. Actions performed by the components of the example system may be illustrated using arrows and circled numbers described herein using bracketed numbers (e.g., "[1]").

The example system of FIG. 4E includes a client device (410) that communicates with file system server B (404) to access I-node B1. As illustrated throughout FIGS. 4A-4F, I-node B1 is assigned to file system B (404). Because of this assignment, and because the assignment is present in the data of I-node B1, the client device (410) determines that it should communicate with file system B (404) to access the contents of the directory for I-node B1 named "\tmp". The communication includes sending a request to file system server B (404) for I-node B1 and file system server B (404) performing the method discussed in FIG. 3A by providing the list of file system objects in the requested directory [1]. In this example, a directory display (430) is used to display the directory and its contents to the client device (410).

Figure 4F:
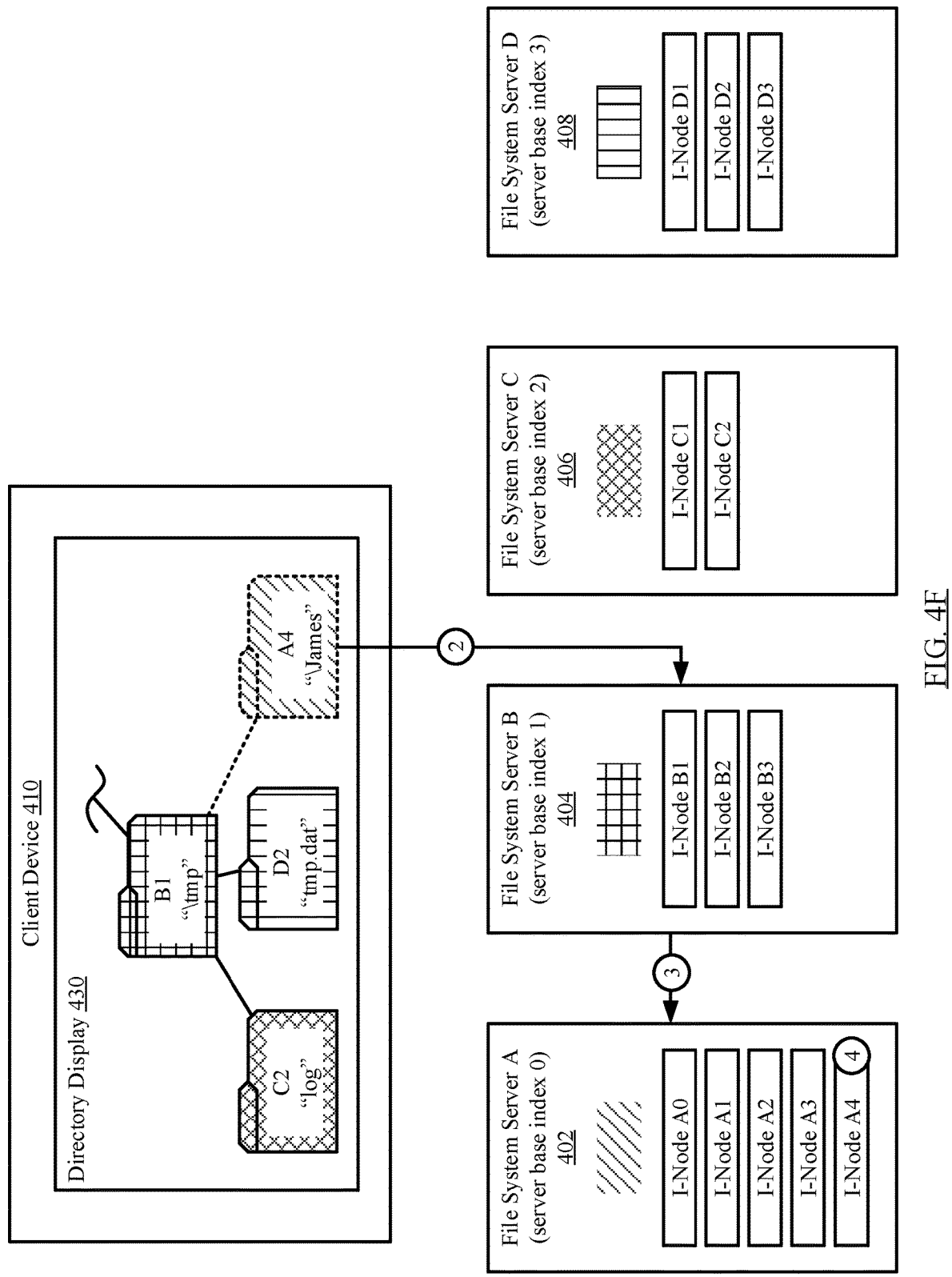

Turning to FIG. 4F, FIG. 4F shows a second diagram of the example system. At a later point in time, the client device (404) initiates the generation of a new file system object. Specifically, the client device (404) generates a new directory, named "\James", and adds the new directory to the "\tmp" directory. This initiates a request to file system server B (404) (which manages the "\tmp" directory) to generate a new I-node for the new directory [2].

In response to receiving the new request for the new directory, file system server B (404) performs the method discussed in FIG. 3B to assign the new directory to one of the four file system servers (402, 404, 406, 408). Specifically, file system server B (404) applies a round-robin algorithm that includes Example Equation 1: assigned_server=(base_server_index+directory_index) % number_servers.

Using the above equation, the assigned_server is calculated by inputting: (i) "1" for the base_server_index variable, based on the numerical value assigned to server base index of file system server B (404); (ii) "3" for the directory_index, based on the next available directory index in the "\tmp" directory (given that "1" and "2" are already assigned to I-nodes C2 and D2, respectively); and (iii) "4" for the number_server variable, based on the four total number of file system servers in the system. The result is a sum of 2 and 2 to give 4, and 4 modulo 4 gives the result is an assigned_server value of 0.

Using this result, file system server B (404) determines that the file system server corresponding to server base index 0 (i.e., file system server A (402)) is to manage the new directory. Based on this determination, file system B (404) generates a new I-node (labeled A3) using the type of the new file system object (i.e., a directory), the assigned file system server, and the assigned directory index (i.e., "3") in the "\tmp" directory. The generated I-node is sent to file system server A (402) [3].

After receiving the new I-node A4, file system server A (402) confirms that an entry in the file system object metadata for I-node A3 does not exist, and, based on this determination, generates a new entry in the file system object metadata [4]. The new entry specifies I-node A3 and the list of file system objects in directory "\James". In this example, no file system objects are parented by the "\James" directory, so the list is empty.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the organization of large quantities of file system objects in a file system. For large quantities of directories, files, etc., it may be beneficial to efficiently distribute the management of the file system objects. Each file system server includes functionality for determining which file system server to manage a given I-node. The algorithm used for such determination may require a minimum number of inputs such as a base index of the assigning file system server, the next available directory index, and the total number of file system servers in the system. Such minimal processing for the determination may result in a more efficient assigning of file system objects.

For these large quantities of file system objects, it may be beneficial to efficiently identify an assigned file system server for any given I-node. Because the file system server is identified in the I-node, less lookup is required to perform the identification. This may improve the overall efficiency of accessing a file system.

Thus, embodiments of the invention may address the problem of inefficient use of computing resources. This problem arises due to the technological nature of the environment in which file systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A system for managing storage of metadata, comprising:
a plurality of file system servers comprising a first file system server and a second file system server,
wherein the first file system server comprises a processor, and
wherein the first file system server is programmed to:
receive a request for a file system object of a file system from a client device via a network;
in response to the request:
make a determination that the second file system server is to manage the file system object,
wherein the determination is based on a round-robin algorithm, and
wherein the round-robin algorithm comprises a function applied to each of a list consisting of:
a first server base index corresponding to the first file system server,
a directory index field corresponding to an index of the file system object in a directory of the file system, and
a total number of the plurality of file system servers;
based on the determination, generate an index node (I-node) associated with metadata of the file system object; and
send the I-node to the second file system server,
wherein the I-node comprises:
an object type field corresponding to a type of the file system object,
a second server base index field corresponding to the second file system server, and the directory index field.

2. The system of claim 1, wherein the second file system server is programmed to:
receive the I-node from the first file system server,
make a second determination, using the directory index field, that an entry is not stored for the I-node; and
based on the second determination, generate a new entry in the file system object metadata for the I-node.

3. The system of claim 2, wherein the second file system server is further programmed to:
receive, from the client device, a second request for the file system object from the client device, wherein the second request comprises the I-node;
identify, using the object type field, the type of the file system object;
identify, using the second server base index field and the directory index field, the new entry in the file system object metadata; and
provide, based on the type of the file system object, data associated with the file system object to the client device using metadata in the new entry.

4. The system of claim 3, wherein the type of the file system object corresponds to a directory.

5. The system of claim 4, wherein the data comprises a list of other file system objects in the directory.

6. The system of claim 3, wherein the type of the file system object corresponds to a file.

7. The system of claim 6, further comprising:
a storage device of a storage system,
wherein the second file system server is further programmed to: before providing the data, obtain, using metadata specified in the new entry, the data from the storage device via the network,
wherein the data is associated with the file,
wherein the metadata comprises a network address to the data in the storage device.

8. The system of claim 7, wherein the storage device comprises:
a plurality of persistent memory (PMEM) devices, wherein the data is stored on a PMEM device of the plurality of PMEM devices.

9. The system of claim 1, wherein the network is a remote direct media access (RDMA) network fabric.

10. The system of claim 1,
wherein the client device comprises an I-node server mapping data structure, and
wherein the I-node server mapping data structure maps the second server base index field to a network address of the second file system server in the network.

11. The system of claim 10, wherein the I-node server mapping data structure further maps the second server base index field to a second network address of a redundant file system server of the plurality of file system servers.

12. A method for managing storage of metadata, comprising:
receiving, by a first file system server of a plurality of file system servers managing a file system and from a client device, a request for a file system object of the file system;
in response to the request:
making a determination that a second file system server is to manage the file system object,
wherein the determination is based on a round-robin algorithm, and
wherein the round-robin algorithm comprises a function applied to each of a list consisting of:
a first server base index corresponding to the first file system server,
a directory index field corresponding to an index of the file system object in a directory of the file system, and
a total number of the plurality of file system servers;
based on the determination, generating an index node (I-node) associated with metadata of the file system object,
wherein the I-node comprises:
an object type field corresponding to a type of the file system object,
a second server base index field corresponding to the second file system server, and
the directory index field, sending the I-node to the second file system server;
obtaining, from the second file system server, data associated with the file system object; and
providing the data to the client device.

13. The method of claim 12, further comprising:
receiving, by the first file system server, a second request for accessing a second file system object, wherein the request comprises a second I-node;
in response to the second request:
identifying, using a second object type field of the second I-node, the type of the second file system object;
identifying, using a third server base index field and a second directory index field of the second I-node, a second entry in the file system object metadata; and
providing, based on the type of the file system object, the data associated with the second file system object to the client device using metadata in the second entry.

14. The method of claim 12, wherein the type of the file system object corresponds to a directory.

15. The method of claim 14, wherein the data comprises a list of other file system objects in the directory.

16. The method of claim 12, wherein the type of the file system object corresponds to a file.

17. The method of claim 16, further comprising:
before providing the data, obtaining, using the file system object metadata, the data from a storage system,
wherein the file system object metadata comprises a network address to the data in the storage system.

18. A non-transitory computer readable medium comprising computer readable program code, which when executed by a computer processor enables the computer processor to perform a method for managing storage of metadata, comprising:

receiving, by a first file system server of a plurality of file system servers and from a client device, a request for a file system object;
in response to the request:
making a determination that a second file system server is to manage the file system object,
wherein the determination is based on a round-robin algorithm, and
wherein the round-robin algorithm comprises a function applied to each of a list consisting of:
a first server base index corresponding to the first file system server,
a directory index field corresponding to an index of the file system object in a directory of the file system, and
a total number of the plurality of file system servers;
based on the determination, generating an index node (I-node) associated with metadata of the file system object,
wherein the I-node comprises:
an object type field corresponding to a type of the file system object,
a second server base index field corresponding to the second file system server, and
a directory index field corresponding to an index in a file system object metadata of the second file system server;
sending the I-node to the second file system server;
obtaining, from the second file system server, data associated with the file system object; and
providing the data to the client device.

* * * * *